Dec. 21, 1954  G. SWIKART  2,697,377
OPHTHALMOSCOPES
Filed Nov. 19, 1952
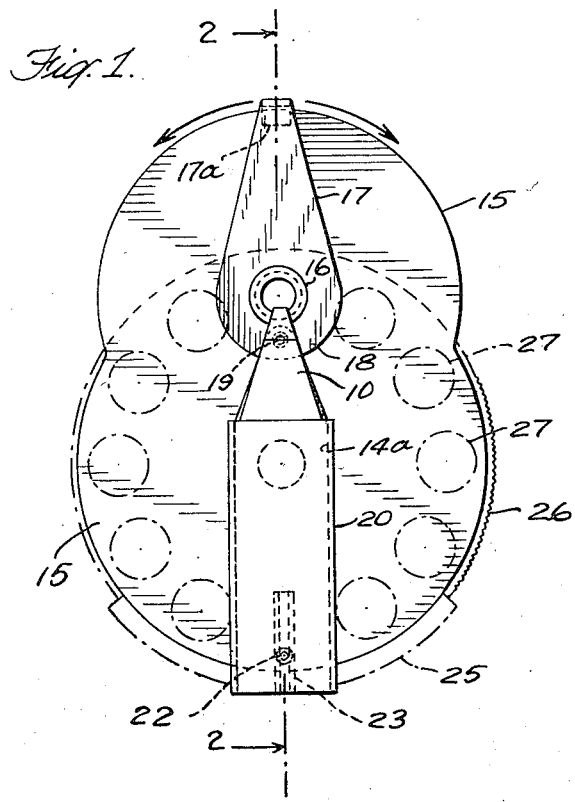
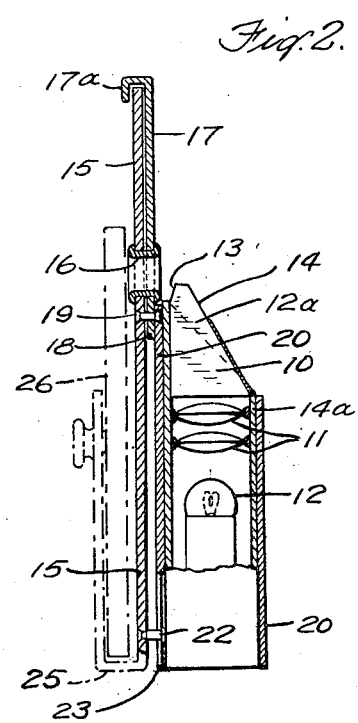
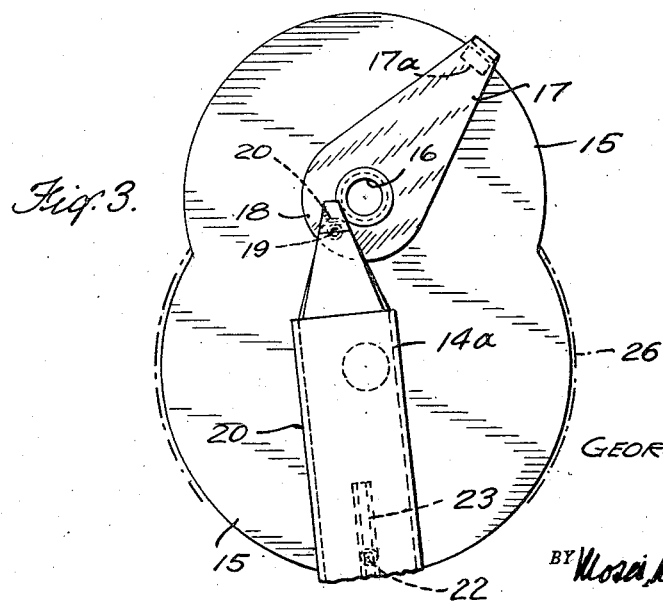
INVENTOR.
GEORGE SWIKART.
ATTORNEYS

United States Patent Office 2,697,377
Patented Dec. 21, 1954

2,697,377

OPHTHALMOSCOPE

George Swikart, Yonkers, N. Y.

Application November 19, 1952, Serial No. 321,428

5 Claims. (Cl. 88—20)

My present invention relates to ophthalmoscopes.

An ophthalmoscope is an instrument for examining the interior of the eye. It comprises a source of light which is reflected into the patient's eye to form an image approximately on the retina, thus permitting the retina or a portion thereof to be viewed by the observer.

A drawback to the ophthalmoscope, which has long been recognized, arises from the fact that the cornea of the patient acts as a reflector of the light source into the observer's eye. It is a principal object of my invention to overcome this drawback by first of all providing a light source of adequate intensity but of very small size so that the image thereof as reflected by the cornea will afford the minimum of inconvenience to the observer. It is a further object to so mount the light source with respect to an observation tube (through which the observer views the patient's eye) that the observer, by simple manipulation, may rotate the light source preferably concentrically of the tube axis for a quadrant, more or less, in either direction so as progressively to illuminate other parts of the retina.

Further objects of my invention and the advantages thereof will be apparent as the description proceeds.

My invention will be best understood by reference to the following detailed description taken with the annexed drawings, in which Fig. 1 is a view in elevation of an illustrative embodiment;

Fig. 2 is a view in section taken on line 2—2 of Fig. 1; and

Fig. 3 is a view with parts broken away similar to Fig. 1 but showing the illuminator in a different position.

Referring to Fig. 1, the illuminator 10 comprises a pyramid or cone of glass or other suitable plastic, associated with which at the larger end thereof is a condenser 11 and an electric lamp 12. Preferably the sides of the pyramidal or conical illuminator 10 are silvered so as to provide internal reflecting surfaces, such reflecting surfaces being protected by a coating of paint 12a, as is customary in the art.

The pyramid or cone thus formed is preferably truncated to form a comparatively small internally reflecting surface 13 disposed at an angle to the vertical as shown, such surface preferably being silvered and not more than 1/16 of an inch on a side. Thereby the silvered surface 13 gives a concentrated beam of light whose axis is approximately at right angles to the axis of the illuminator. In order not to interfere with this beam, the silvered surface opposite said mirror and in the path of the beam is removed so as to create a window 14 therefor of generally trapezoidal shape as will be evident from Fig. 1.

Parts 10, 11 and 12 are integrated in a suitable casing 14a. By virtue of the construction described, the window 14 may be as small as 1/16 of an inch or less in diameter whereby it produces a concentrated beam of light such that the corneal reflection thereof is so small as to constitute no substantial inconvenience to the observer.

As above stated, it is a further object to provide means for holding the light source in adjusted positions so as progressively to move the reflection of the light source from the cornea out of the line of observation. To this end I have provided a shield 15 preferably having the configuration of the area enclosed by the figure eight (8) which conveniently at the upper center thereof contains a tube 16 through which the retina is viewed. Pivotally supported by the tube 16 which most conveniently constitutes a hollow rivet or eyelet is a lever or fingerpiece 17, such member having a portion extending beyond the tube 16 as at 18 and containing a pivot 19 for a supporting member or housing 20 for the casing 14a for the illuminator 10. At the opposite end, fingerpiece 17 may be bent over the edge of plate 15 as at 17a, the better to maintain the pieces 15 and 17 in parallelism.

In order to afford a sliding attachment of the housing 20 to the plate 15, said housing may be held in sliding relation to said plate by means of a headed pin 22, the body of which passes through a slot 23 in the housing 20 to the plate 15 in which it is fixed. Thereby the fingerpiece 17 in the housing 20 may assume the positions shown in Fig. 3, for example. While forming no part of the present invention, the improved ophthalmoscope has been illustrated in connection with a housing 25 containing a disk 26 in which is mounted lenses 27, etc., said disk being revoluble by means of a milled edge of the disk 26 whereby to bring any of said lenses 27 opposite the aperture of the tube 16 for use in viewing the retina.

In use the operator holds the instrument so as to see through the pupil of the patient; then by moving the fingerprint 17 with reference to the illuminator 10, he may vary the position of the illuminator to maneuver its reflection from the cornea out of the line of observation.

The illuminator 10 may be either of rectangular or of circular cross section.

This application is a continuation-in-part of my copending application Serial No. 171,181, filed June 29, 1950, now abandoned.

I claim:

1. In an ophthalmoscope, an illuminator having a light beam exit surface of small size, a mounting therefor, an observation tube held therein and passing therethrough, a lever mounted on said tube so as to pivot therearound substantially concentrically of the axis of said tube, said lever having said illuminator pivotally attached thereto with its pivot spaced from said tube axis and with its light exit surface immediately adjacent the periphery of said tube whereby manipulation of said lever will cause said light exit surface to be moved substantially concentrically of said tube, and cooperating means on the plate and illuminator for guiding the movement of said illuminator relative to said plate.

2. In an ophthalmoscope, an illuminator having a light beam exit surface of small size, a support therefor having an observation aperture therein, a lever, a pivot therefor substantially concentric of said aperture, said lever having said illuminator pivotally attached thereto with its light exit surface immediately adjacent the periphery of said aperture whereby manipulation of said lever will cause said light exit surface to have a movement substantially concentric of the aperture whereby the corneal reflection may be kept out of the line of observation.

3. In an ophthalmoscope, an illuminator comprising a shaft of light transmitting material acting to transmit a concentrated light beam for a source operatively disposed with respect to said shaft, said illuminator having a relatively small window for the exit of said concentrated light beam and a mounting for said illuminator having a substantially circular observation aperture therein, and means for movably attaching said illuminator to said mounting, said means providing for movement of said window around at least 180° of the periphery of said aperture, said window during such movement being adjacent said periphery and spaced from the center of said aperture so as to afford substantially no obstruction to the view therethrough throughout said movement, thereby enabling the observer to view the retina of the patient with avoidance of the corneal reflection.

4. An ophthalmoscope in accordance with claim 3 in which said window is not substantially larger than 1/16" in its greatest dimension.

5. In an ophthalmoscope, an illuminator comprising light transmitting and reflecting material of pyramid-like shape which is truncated close to its theoretical apex by a light reflecting surface disposed at an angle to the longitudinal axis of said material whereby said material acts to transmit a concentrated light beam from a source operatively disposed with respect to said material, said illuminator being exteriorly coated against the escape of stray light but so as to leave a relatively small window of a size not substantially larger than the cross-section of a concentrated light beam, and a mounting for said illuminator comprising a light shielding plate having a substantially circular observation aperture therein, and means for movably attaching said illuminator to said plate, said means providing for movement of said window around at least 180° of the periphery of said aperture, said window during such movement being adjacent said periphery and spaced from the center of said aperture so as to afford substantially no obstruction to the view therethrough throughout said movement, thereby enabling the observer to view the retina of the patient with avoidance of the corneal reflection.

References Cited in the file of this patent

UNITED STATES PATENTS

| Number | Name | Date |
|---|---|---|
| 2,269,962 | Wappler | Jan. 13, 1942 |

FOREIGN PATENTS

| Number | Country | Date |
|---|---|---|
| 429,636 | Great Britain | June 4, 1935 |
| 488,267 | Great Britain | July 4, 1938 |